(12) United States Patent
Funaki et al.

(10) Patent No.: US 10,593,183 B2
(45) Date of Patent: Mar. 17, 2020

(54) ANTENNA DEVICE, ELECTRONIC DEVICE, AND WIRELESS COMMUNICATION METHOD

(71) Applicant: TOSHIBA CLIENT SOLUTIONS CO., LTD., Koto-ku, Tokyo (JP)

(72) Inventors: Yasuo Funaki, Musashimurayama Tokyo (JP); Takeshi Hosokawa, Fussa Tokyo (JP)

(73) Assignee: Toshiba Client Solutions Co., Ltd., Tokyo (JP)

( * ) Notice: Subject to any disclaimer, the term of this patent is extended or adjusted under 35 U.S.C. 154(b) by 0 days.

(21) Appl. No.: 16/232,989

(22) Filed: Dec. 26, 2018

(65) Prior Publication Data

US 2019/0392694 A1 Dec. 26, 2019

(30) Foreign Application Priority Data

Jun. 26, 2018 (JP) ................. 2018-120788

(51) Int. Cl.
*G08B 21/02* (2006.01)
*H01Q 21/00* (2006.01)
*H04B 7/06* (2006.01)
*H01Q 1/22* (2006.01)
*H04Q 9/02* (2006.01)

(52) U.S. Cl.
CPC .......... *G08B 21/02* (2013.01); *H01Q 1/2266* (2013.01); *H01Q 21/0025* (2013.01); *H04B 7/0693* (2013.01); *H04Q 9/02* (2013.01); *H04Q 2209/40* (2013.01)

(58) Field of Classification Search
CPC .. G08B 21/02; H01Q 1/2266; H01Q 21/0025; H04B 7/0693; H04Q 9/02
USPC ..................................... 340/539.11
See application file for complete search history.

(56) References Cited

U.S. PATENT DOCUMENTS

| 7,738,877 | B2* | 6/2010 | Amos | ................ | G01R 29/0878 370/310 |
| 2002/0094010 | A1* | 7/2002 | Vail | .......................... | H01Q 1/02 374/183 |
| 2005/0275585 | A1* | 12/2005 | Shima | ................... | G01S 7/4008 342/174 |
| 2007/0090997 | A1* | 4/2007 | Brown | ..................... | H01Q 3/46 343/700 MS |

(Continued)

FOREIGN PATENT DOCUMENTS

| JP | 2005-204230 A | 7/2005 |
| JP | 2015-19288 A | 1/2015 |
| JP | 2017-195471 A | 10/2017 |

*Primary Examiner* — Kerri L McNally
(74) *Attorney, Agent, or Firm* — Knobbe, Martens, Olson & Bear, LLP

(57) ABSTRACT

According to one embodiment, an antenna device includes at least one terminal, a plurality of array antennas, a plurality of sensors corresponding to the plurality of array antennas, and a selection circuit. Each sensor of the plurality of sensors measures a temperature of an array antenna corresponding to the sensor among the plurality of array antennas. The selection circuit selects at least one array antenna from the plurality of array antennas, based on the temperature measured by each sensor. The at least one array antenna is connected to a wireless communication circuit via the at least one terminal.

16 Claims, 11 Drawing Sheets

(56) References Cited

U.S. PATENT DOCUMENTS

2008/0260002 A1* 10/2008 Zhang .................. H04B 7/0417
                                                            375/144
2018/0233821 A1*  8/2018 Pham ..................... H01Q 3/267

* cited by examiner

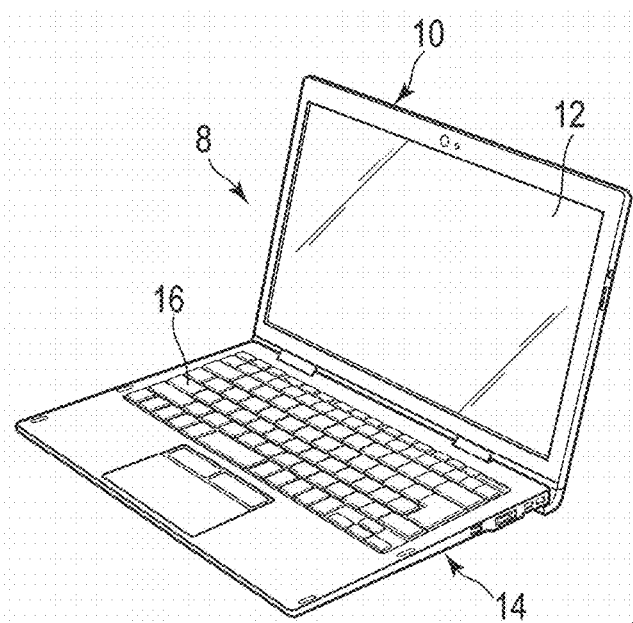
FIG. 1A
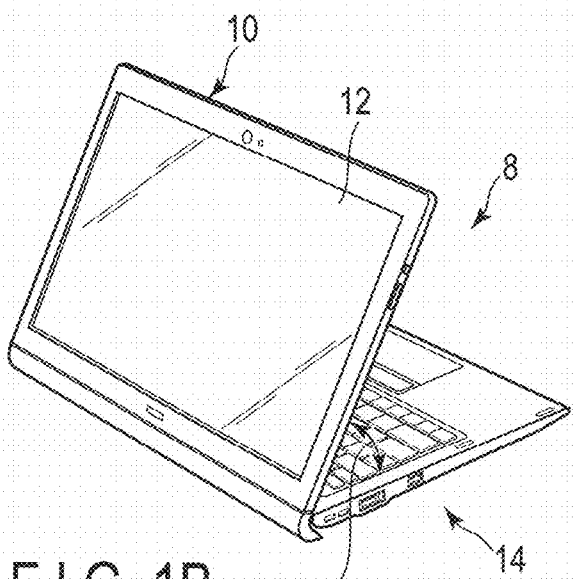
FIG. 1B Approximately 60 to 70 degrees
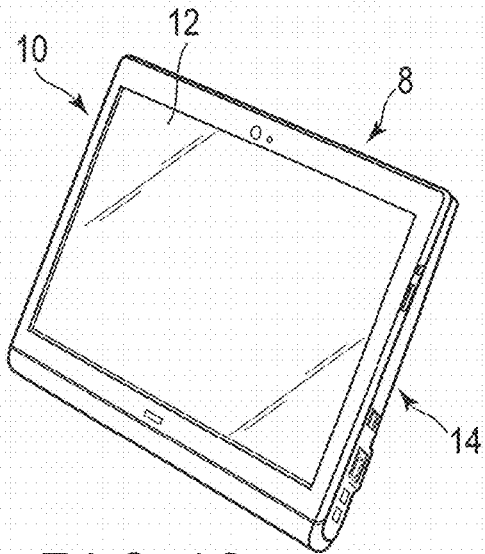
FIG. 1C
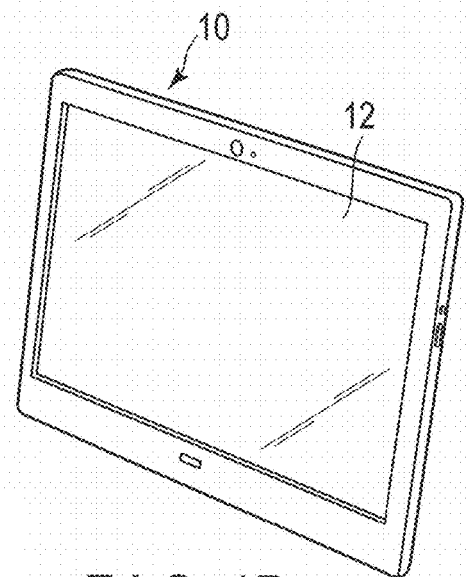
FIG. 1D

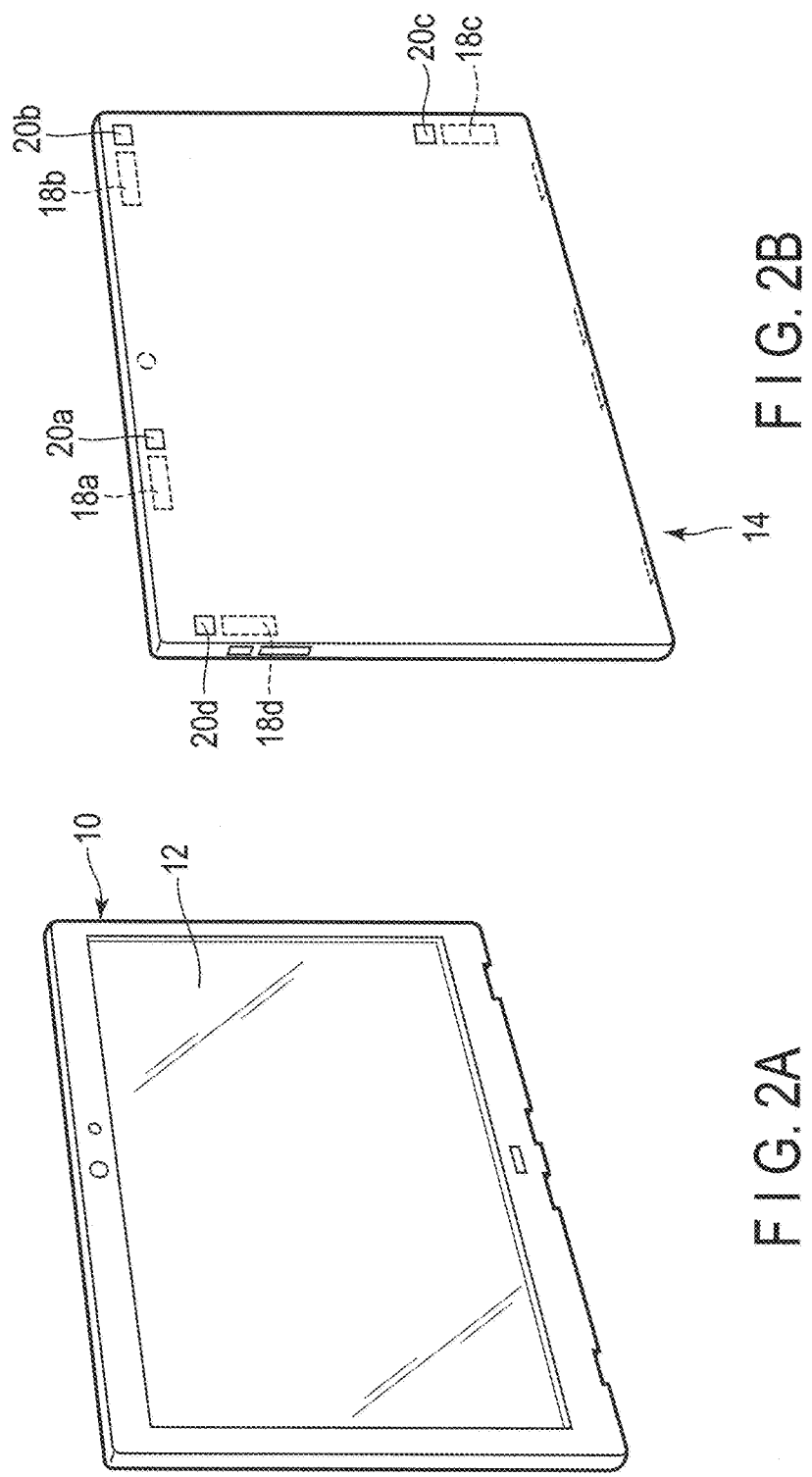

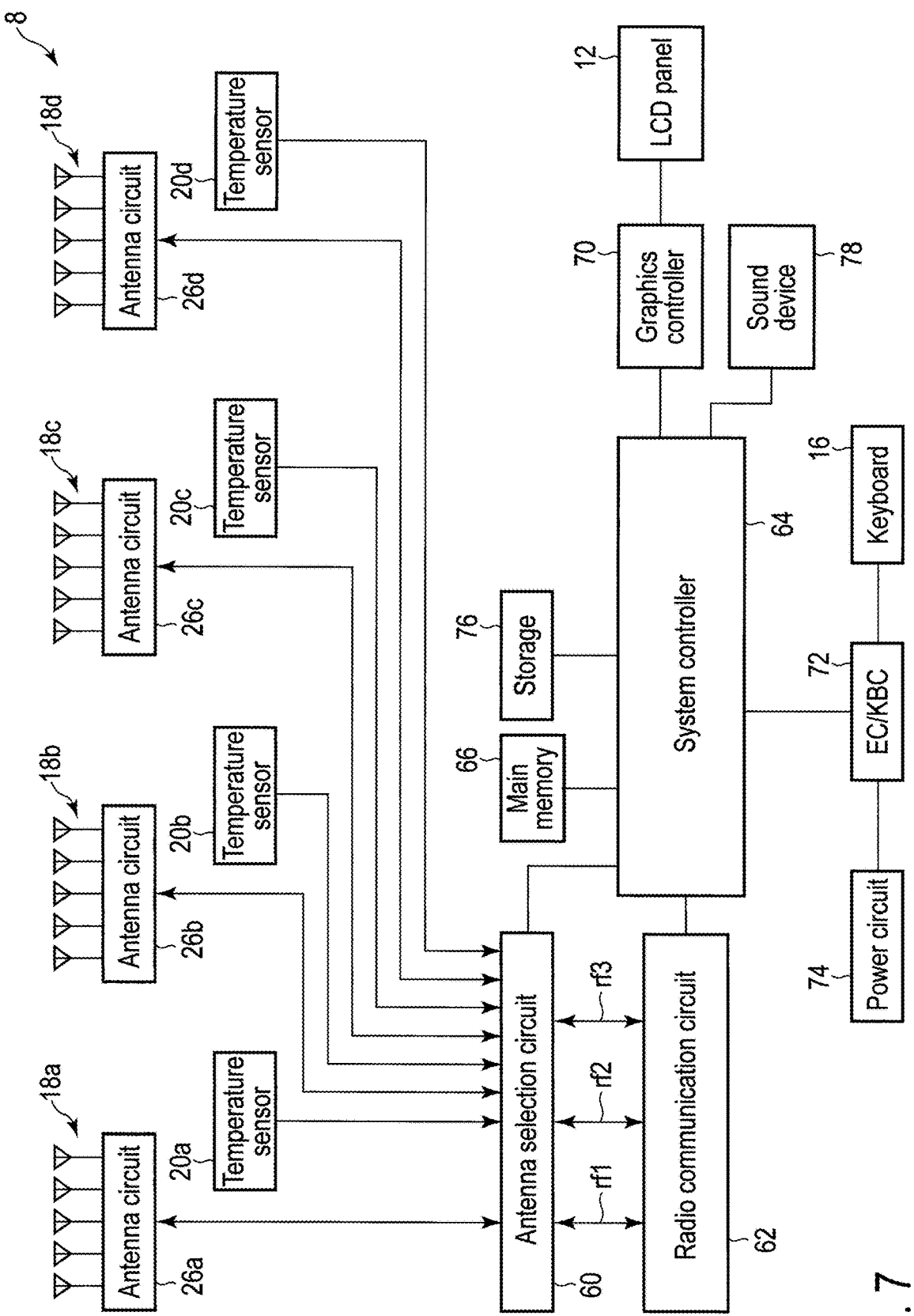
F I G. 7

$$\begin{pmatrix} R1 \\ R2 \end{pmatrix} = \begin{pmatrix} h11 & h12 \\ h21 & h22 \end{pmatrix} \begin{pmatrix} T1 \\ T2 \end{pmatrix} + \begin{pmatrix} n1 \\ n2 \end{pmatrix}$$

| Array antenna | Connection condition data | Usable/unusable data |
|---|---|---|
| Array antenna 18a | Not-connected | Usable |
| Array antenna 18b | Not-connected | Usable |
| Array antenna 18c | Not-connected | Usable |
| Array antenna 18d | Not-connected | Usable |
| ... | ... | ... |

FIG. 11

| Array antenna | Connection condition data | Usable/unusable data |
|---|---|---|
| Array antenna 18a | RF 1 | Usable |
| Array antenna 18b | RF 2 | Usable |
| Array antenna 18c | RF 3 | Usable |
| Array antenna 18d | Not-connected | Usable |
| ... | ... | ... |

FIG. 12

| Array antenna | Connection condition data | Usable/unusable data |
|---|---|---|
| Array antenna 18a | RF 1 | Unusable |
| Array antenna 18b | RF 2 | Usable |
| Array antenna 18c | RF 3 | Usable |
| Array antenna 18d | Not-connected | Usable |
| ... | ... | ... |

FIG. 13

| Array antenna | Connection condition data | Usable/unusable data |
|---|---|---|
| Array antenna 18a | Not-connected | Unusable |
| Array antenna 18b | RF 2 | Usable |
| Array antenna 18c | RF 3 | Usable |
| Array antenna 18d | RF 1 | Usable |
| ... | ... | ... |

FIG. 14

| Array antenna | Connection condition data | Usable/unusable data |
|---|---|---|
| Array antenna 18a | Not-connected | Usable |
| Array antenna 18b | RF2 | Usable |
| Array antenna 18c | RF3 | Usable |
| Array antenna 18d | RF1 | Usable |
| ... | ... | ... |

FIG. 15

ANTENNA DEVICE, ELECTRONIC DEVICE, AND WIRELESS COMMUNICATION METHOD

CROSS-REFERENCE TO RELATED APPLICATIONS

This application is based upon and claims the benefit of priority from Japanese Patent Application No. 2018-120788, filed Jun. 26, 2018, the entire contents of which are incorporated herein by reference.

FIELD

Embodiments described herein relate generally to an antenna device, an electronic device, and a wireless communication method.

BACKGROUND

In recent years, various electronic devices include a wireless communication function. Frequencies used for the wireless communication become higher when the data amount for communication become greater. For example, a high frequency band such as super high frequency (SHF) band or extra high frequency (EHF) band of which wavelength is shorter than that of ultra high frequency (UHF) band is now used. When the frequency becomes high, straightness of radio waves becomes excellent, and a gain of a certain direction becomes greater than gains of other directions, and thus, the radio waves have directivity. A single antenna has difficulty in controlling the directivity. Array antennas including a plurality of arrayed antenna elements can control direction and width of beam by controlling a phase of each antenna element, and can transmit and receive omnidirectional radio waves.

In an array antenna, a plurality of antenna elements and an electric circuit such as an amplifier may be accommodated in one chip. The electric circuit generates heat in operation. When the temperature of the array antenna increases, the quality of communication of signals to be transmitted/received decreases. Furthermore, latest models of electronic devices become thinner in consideration of mobility, and thus, the heat generated by the electric circuit of the array antenna easily transfers to the casing of the electronic device. This causes a surface temperature of the casing in the proximity of the array antenna increases and a user may be hurt by low temperature burns.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIGS. 1A, 1B, 1C, and 1D are perspective views of an example of an electronic device 8 according to an embodiment.

FIGS. 2A and 2B are perspective views of an example of the arrangement of array antennas 18a, 18b, 18c, and 18d in the electronic device 8 according to the embodiment.

FIG. 7 is a block diagram showing an example of the electronic device 8.

FIG. 11 shows an example of a connection control table 90 in an antenna selection circuit 60.

FIG. 12 shows another example of the connection control table 90 in the antenna circuit 60.

FIG. 13 shows still another example of the connection control table 90 in the antenna circuit 60.

FIG. 14 shows still another example of the connection control table 90 in the antenna circuit 60.

FIG. 15 shows still another example of the connection control table 90 in the antenna circuit 60.

DETAILED DESCRIPTION

Figure 3A:
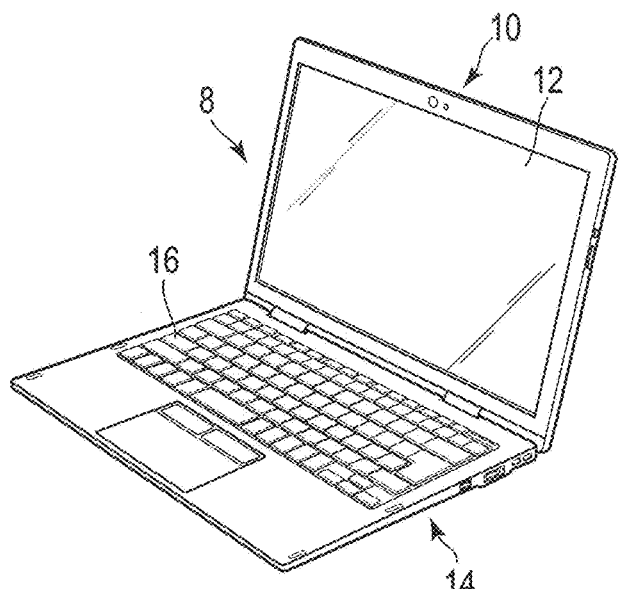
FIGS. 3A, 3B, 3C, and 3D are perspective views of another example of the electronic device 8 according to the embodiment.

Various embodiments will be described hereinafter with reference to the accompanying drawings. The disclosure is merely an example and is not limited by contents described in the embodiments described below. Modification that is easily conceivable by a person of ordinary skill in the art comes within the scope of the disclosure as a matter of course. In order to make the description clearer, the sizes, shapes and the like of the respective parts may be changed and illustrated schematically in the drawings as compared with those in an accurate representation. Constituent elements corresponding to each other in a plurality of drawings are denoted by similar reference numerals and their detailed descriptions may be omitted unless necessary.

In general, according to one embodiment, an antenna device includes at least one terminal, a plurality of array antennas, a plurality of sensors corresponding to the plurality of array antennas, and a selection circuit. Each sensor of the plurality of sensors measures a temperature of an array antenna corresponding to the sensor among the plurality of array antennas. The selection circuit selects at least one array antenna from the plurality of array antennas, based at least in part on the temperature measured by each sensor. The at least one array antenna is connected to a wireless communication circuit via the at least one terminal.

[Overall Structure]

FIGS. 1A, 1B, 1C, and 1D show a detachable 2-in-1 type personal computer as an example of an electronic device according to an embodiment. The personal computer 8 is formed of a main body 14 and a detachable display unit 10. FIG. 1A is a perspective view where the display unit 10 is attached to an end of the main body 14 to be used as a clamshell computer. A liquid crystal display (LCD) panel 12 is disposed on the surface of the display unit 10. A panel substrate (that is not shown) is installed inside the display unit 10. The main body 14 includes a thin box-shaped casing, a keyboard 16 on the upper surface of the casing, and a circuit board (that is not shown) inside the casing. FIG. 1A shows a state where the display unit 10 is attached to the main body 14 at a certain angle such that a user operating the keyboard 16 can see the LCD panel 12. FIG. 1B shows a state where the display unit 10 is attached to the main body 14 in a direction opposite to that of FIG. 1A, that is, FIG. 1B shows a state where the display unit 10 is attached to the main body 14 at a certain angle such that a third person facing the user operating the keyboard 16 can see the LCD panel 12. FIG. 1C shows a state where the display unit 10 is overlaid on the main body 14 such that the rear surface of the display unit 10 is opposed to the keyboard 16 of the main body 14. The display unit 10 and the main body 14 are used as a tablet in order for a user holding the personal computer 8 to see the LCD panel 12. FIG. 1D shows a state where the display unit 10 is detached from the main body 14 and the display unit 10 alone is used as a tablet.

The personal computer 8 includes a plurality of array antennas. The array antennas may be attached to a panel substrate of the display unit 10, or may be attached to a circuit substrate of the main body 14. FIGS. 2A and 2B show an example where the array antennas are attached to the circuit substrate of the main body 14. FIG. 2A is a perspective view showing the display unit 10 alone. FIG. 2B is a perspective view of the main body 14 alone. As shown in FIG. 2B, two array antennas 18a and 18b are provided with a front end of the main body 14. An array antenna 18c is provided with a rear side of the right side of the main body 14 in the state of FIG. 1A. An array antenna 18d is provided with a front side of the left side of the main body 14 in the state of FIG. 1A.

Temperature sensors 20a, 20b, 20c, and 20d are arranged in the proximity of the array antennas 18a, 18b, 18c, and 18d, respectively. If the temperature sensors 20a, 20b, 20c, and 20d include a conductor, the conductor may affect the array antennas 18a, 18b, 18c, and 18d, and thus, the temperature sensors 20a, 20b, 20c, and 20d are arranged to be apart from the array antennas 18a, 18b, 18c, and 18d at a certain interval.

Figure 3B:
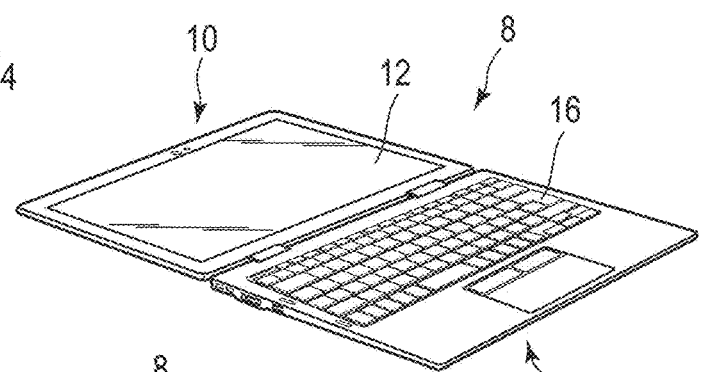
Figure 3C:
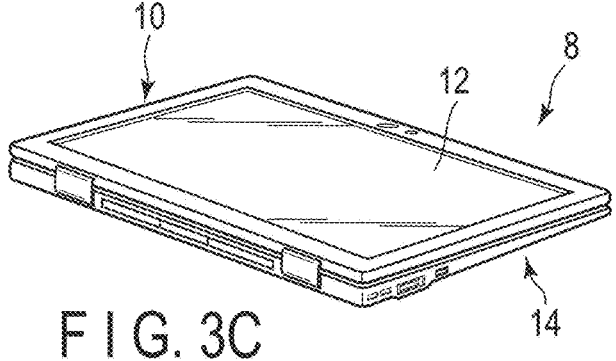
Figure 3D:
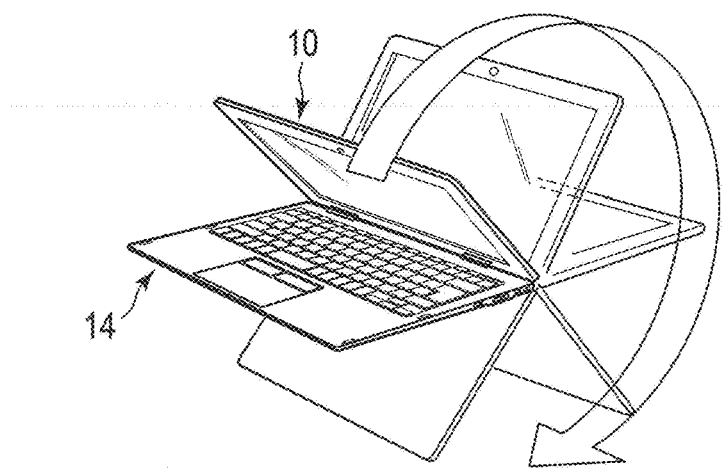

The 2-in-1 type personal computer 8 is not limited to a detachable type and may be realized as a compatible type. FIGS. 3A to 3D show a compatible 2-in-1 type personal computer 8. As in a conventional clamshell personal computer, the display unit 10 is attached to the main body 14 in a non-detachable manner. Unlike the conventional clamshell personal computer, the display unit 10 can be continuously rotated around the main body 14 in 360 degrees, as shown in FIG. 3D. FIG. 3A shows a state where the personal computer 8 is used as a clamshell personal computer. FIG. 3B shows a state where the display unit 10 is rotated at 180 degrees with respect to the main body 14. FIG. 3C shows a state where the display unit 10 is rotated to 360 degrees with respect to the main body 14.

Figure 4:
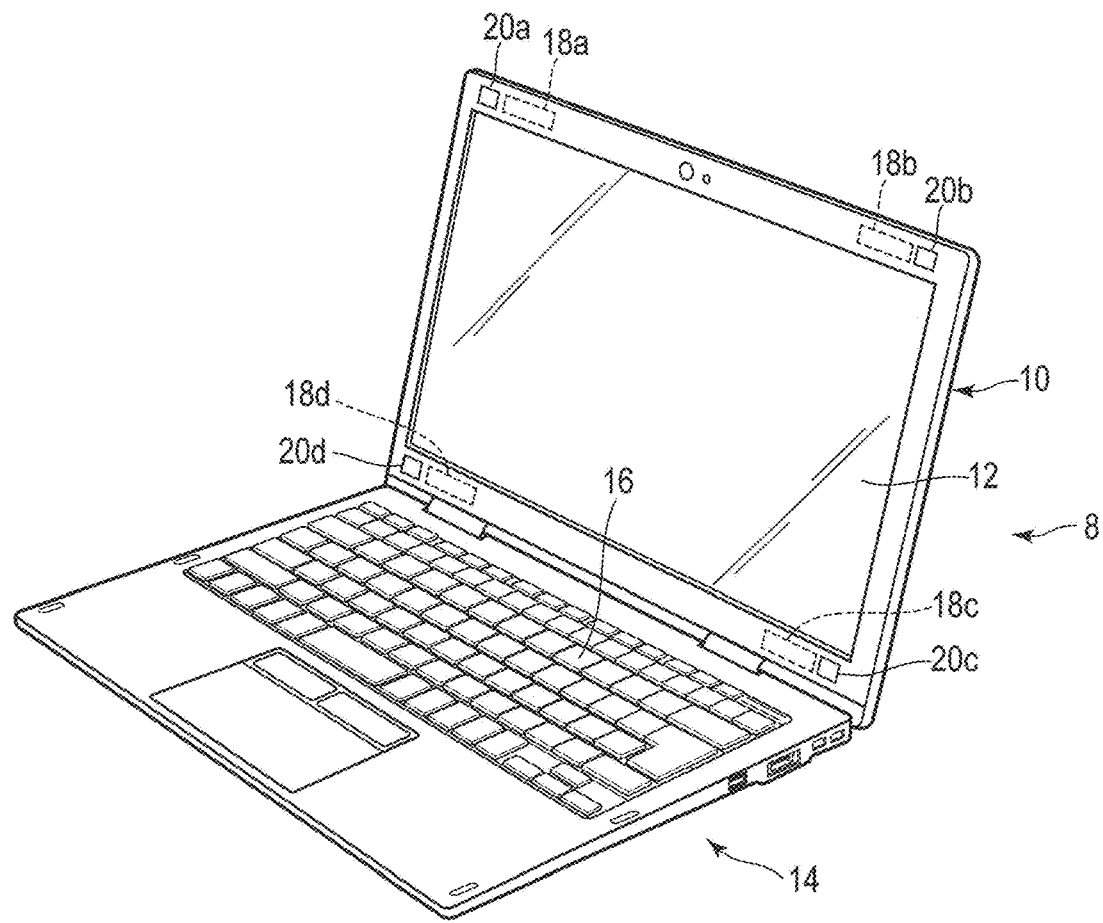
FIG. 4 is a perspective view of another example of the arrangement of array antennas 18a, 18b, 18c, and 18d in the electronic device 8 according to the embodiment.

The array antennas 18a, 18b, 18c, and 18d are, as shown in FIG. 4, attached to the panel substrate of the display unit 10 where the LCD panel 12 is not formed. If the device is used as a clamshell computer, two array antennas 18a and 18b are provided with the right and left of the upper end part of the display unit 19, and two array antennas 18c and 18d are provided with the right and left of the lower end part thereof. The temperature sensors 20a, 20b, 20c, and 20d are arranged in the proximity of the array antennas 18a, 18b, 18c, and 18d, respectively.

Furthermore, some of the array antennas may be attached to the panel substrate of the display unit 10 and the other array antennas may be attached to the circuit substrate of the main body 14. The number of the array antennas 18a to 18d is not limited to four, and may be two, three, five or more.

The temperature sensors 20a, 20b, 20c, and 20d respectively measure peripheral temperatures of the array antennas 18a, 18b, 18c, and 18d, and output detection signals indicative of whether or not the measured temperatures are above a certain temperature. Thus, it can be determined whether or not each of the temperature of the array antennas 18a, 18b, 18c, and 18d is above an allowable temperature, that is, whether or not each of the array antennas 18a, 18b, 18c, and 18d is generating heat. The allowable temperature is set to a temperature that does not cause deterioration of quality of transmission/reception signals or low temperature burns. Each of the temperature sensors 20a, 20b, 20c, and 20d include a thermistor, or a thermocouple, or the like.

A thermistor is an element of which resistance value changes corresponding to a temperature detected. When a resistor of certain value and a thermistor are connected in series to form a voltage divider, a voltage (partial voltage) applied to the thermistor varies corresponding to a temperature. Thus, the temperature can be measured. Note that there are two types of thermistors depending on how the resistance value changes corresponding to a temperature. In the first type, the resistance value decreases (changes nonlinearly) when the temperature increases. In the second type, the resistance value is substantially constant to a certain temperature and then steeply increases after the certain temperature. In the present embodiment, the temperatures of the array antennas may be directly detected using the thermistor of the first type. However, it is sufficient to merely detect if the temperature of the array antenna exceeds the allowable temperature using the second type in order to prevent decrease of the quality of transmitted/received signal and low temperature burns of users. When the temperature increases, a thermal electromotive force increases, and using this mechanism, a thermocouple outputs a voltage corresponding to a temperature. Note that, instead of the thermistor or the thermocouple, a diode, a bipolar transistor, or the like, may be used. A forward voltage of the diode, the bipolar transistor, or the like changes by a temperature. If the diode, the bipolar transistor, or the like is used, a temperature can be directly detected.

[Array Antenna]

Figure 5:
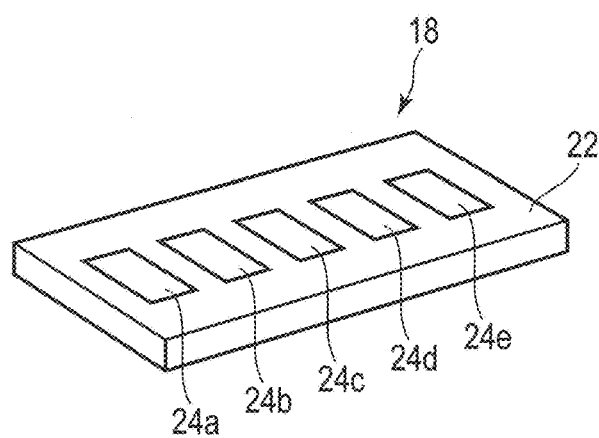
FIG. 5 is a perspective view of an example of the array antenna 18 in the electronic device 8.

The array antennas 18a, 18b, 18c, and 18d (array antenna is indicated by 18 when it is generally referred to) have the same structure, and FIG. 5 shows a perspective view of the array antenna 18. The array antenna 18 includes a plurality of, for example, five antenna elements 24a, 24b, 24c, 24d, and 24e formed of a flat conductive substance. The antenna elements 24a, 24b, 24c, 24d, and 24e are formed on the surface of a rectangular parallelepiped package 22 formed of a plastic or the like. A substrate including antenna circuits such as an amplifier, an attenuator, a phase shifter, a converter, and the like (not shown in FIG. 5 but shown in FIG. 6) is accommodated within the package 22. The antenna elements 24a, 24b, 24c, 24d, and 24e are electrically connected to the antenna circuits.

FIGS. 2 and 4 show the array antennas 18a, 18b, 18c and 18d, and the temperature sensors 20a, 20b, 20c and 20d, are formed separately while the array antennas and the temperature sensors may be formed integrally. In that case, sensor chips are installed into the packages 22 of the array antennas 18a, 18b, 18c, and 18d. In that case, instead of the peripheral temperatures of the array antennas 18a, 18b, 18c, and 18d, the temperatures of the antennas are directly measured.

Figure 6:
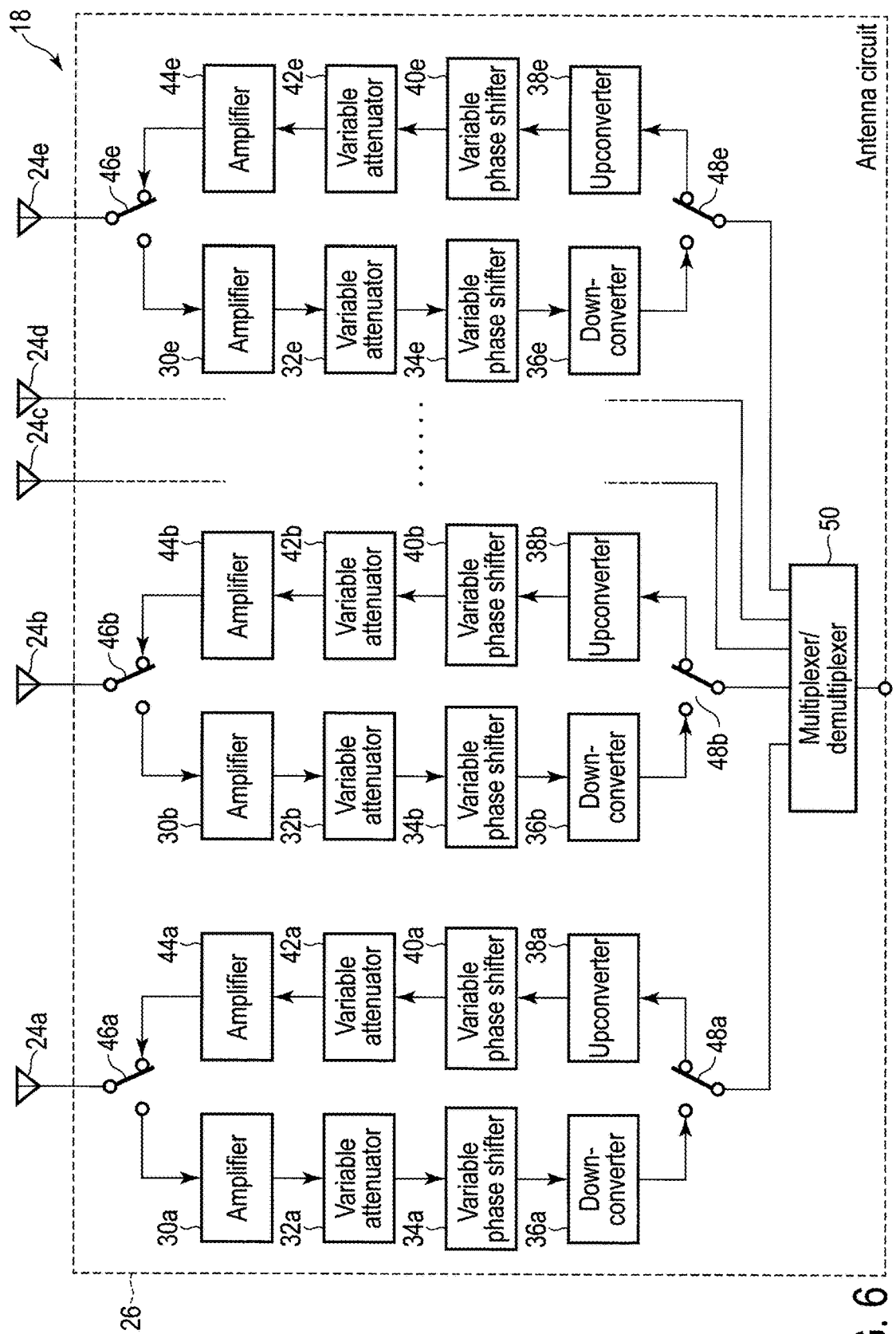
FIG. 6 is a block diagram showing an example of an antenna circuit 26 in the array antenna 18.

FIG. 6 shows an exemplary circuit structure of the array antenna 18 (each of the array antennas 18a, 18b, 18c, and 18d). The array antenna 18 includes the antenna elements 24a, 24b, 24c, 24d, and 24e and an antenna circuit 26. The antenna circuit 26 is divided into circuit parts corresponding to the antenna elements 24a, 24b, 24c, 24d, and 24e, respectively. In FIG. 6, the circuit parts corresponding to the antenna elements 24c and 24d are not depicted for simplification.

Signals received by the antenna elements 24a, 24b, 24c, 24d, and 24e are input to amplifiers 30a, 30b, 30c, 30d, and 30e (30c and 30d are not shown) through receiver terminals of selectors 46a, 46b, 46c, 46d, and 46e (46c and 46d are not shown). The outputs of the amplifiers 30a, 30b, . . . , 30e are input to down converters 36a, 36b, 36c, 36d, and 36e (36c and 36d are not shown) through variable attenuators 32a, 32b, 32c, 32d, and 32e (32c and 32d are not shown) and variable phase shifter 34a, 34b, 34c, 34d, and 34e (34c and 34d are not shown) in this order. The outputs of the down converters 36a, 36b, . . . , 36e are input to first, second, third, fourth, and fifth terminals of a multiplexer/demultiplexer 50 through receiver terminals of selectors 48a, 48b, 48c, 48d, and 48e (48c and 48d are not shown).

The outputs of the first to fifth terminals of the multiplexer/demultiplexer 50 are input to up converters 38a, 38b, 38c, 38d, and 38e (38c and 38d are not shown) through transmitter terminals of the selectors 48a, 48b, 48c, 48d, and 48e (48c and 48d are not shown). The outputs of the up converters 38a, 38b, . . . , 38e are input to amplifiers 44a, 44b, 44c, 44d, and 44e (44c and 44d are not shown) through variable phase shifters 40a, 40b, 40c, 40d, and 40e (40c and 40d are not shown) and variable attenuators 42a, 42b, 42c, 42d, and 42e (42c and 42d are not shown) in this order. The outputs of the amplifiers 44a, 44b, . . . , 44e are input to the antenna elements 24a, 24b, . . . , 24e through transmitter terminals of the selectors 46a, 46b, . . . , 46e.

The multiplexer/demultiplexer 50 distributes (performs demultiplexing of) one transmission signal from an antenna selection circuit 60 (explained later with reference to FIG. 7) to each of the antenna elements 24a to 24e. On the other hand, the multiplexer/demultiplexer 50 composes (performs multiplexing of) a plurality of reception signals from the antenna elements 24a to 24e into one reception signal that is supplied to the antenna selection circuit 60.

As a frequency band of radio signals, SHF, EFH, millimeter wave, or sub-millimeter wave can be used. In this example, the array antennas 18a to 18d are given as antennas for WiGig (registered trademark) based on IEEE802.11ad standard. Thus, the antenna elements 24a to 24e of each of the array antennas 18a to 18d transmit and receive radio signals of 60 GHz. In a reception time, reception signals of 60 GHz are supplied to the down converters 36a to 36e, and the reception signals of 60 GHz are converted into reception signals of low frequency such as 10 GHz by the down converters 36a to 36e, and then, the reception signals of 10 GHz are supplied to the multiplexer/demultiplexer 50. In a transmission time, transmission signals of 10 GHz are supplied from the multiplexer/demultiplexer 50 to the up converters 38a to 38e, the transmission signals of 10 GHz are converted into transmission signals of 60 GHz by the up converters 38a to 38e, and then, the transmission signals of 60 GHz are transmitted from the up converters 38a to 38e to the antenna elements 24a to 24e.

The selectors 46a to 46e and the selectors 48a to 48e are controlled in cooperation by a system controller 64 that will be described later with reference to FIG. 7. In the reception time, circuit parts including the amplifiers 30a to 30e, the variable attenuators 32a to 32e, the variable phase shifters 34a to 34e, and the down converters 36a to 36e are selected by the selectors 46a to 46e and the selectors 48a to 48e. In the transmission time, circuit parts including the up converters 38a to 38e, the variable phase shifters 40a to 40e, the variable attenuators 42a to 42e, and the amplifiers 44a to 44e are selected by the selectors 48a to 48e and the selectors 46a to 46e.

In the transmission time, the phases of the transmission signals output from the up converters 38a to 38e are adjusted by the variable phase shifters 40a to 40e. The transmission signals of which phases are adjusted are supplied to the variable attenuators 42a to 42e. Amplitudes of the transmission signals are adjusted by the variable attenuators 42a to 42e. The transmission signals of which amplitudes are adjusted are supplied to the amplifiers 44a to 44e. Power of the transmission signals is amplified by the amplifiers 44a to 44e. The transmission signals of which power is amplified are supplied to the antenna elements 24a to 24e through the selectors 46a to 46e.

In the reception time, power of reception signals received by the antenna elements 24a to 24e is amplified by the amplifiers 30a to 30e. The reception signals of which power is amplified are supplied to the variable attenuators 32a to 32e. Amplitudes of the reception signals are adjusted by the variable attenuators 32a to 32e. The reception signals of which amplitudes are adjusted are supplied to the variable phase shifters 34a to 34e. Phases of the reception signals are adjusted by the variable phase shifters 34a to 34e. The reception signals of which phases are adjusted are supplied to the down converters 36a to 36e.

Difference characteristics are set to the amplifiers 30a to 30e in advance. Similarly, different characteristics are set to the variable attenuators 32a to 32e, the variable phase shifters 34a to 34e, the variable phase shifters 40a to 40e, the variable attenuators 42a to 42e, and the amplifiers 44a to 44e in advance.

By adjusting the phases and amplitudes and by increasing the power with respect to the transmission and reception signals communicated by the antenna elements 24a to 24e, directivity of the array antenna 18 can be controlled. The adjustment of the phases and amplitudes and the increase of the power may be adoptively changed on the basis of the radio environment. However, the directivity is fixed in the present embodiment, and thus, the adjustment of the phases and amplitudes and the increase of the power are set to predetermined values. Note that, variable attenuators 32a to 32e (or 42a to 42e) or variable phase shifters 34a to 34e (or 40a to 40e) may optionally be omitted.

[System Structure]

FIG. 7 shows an example of the system structure of the personal computer 8. Antenna circuits 26a to 26d of each of the array antennas 18a to 18d are connected to the antenna selection circuit 60. Output signals of the temperature sensors 20a to 20d are supplied to the antenna selection circuit 60. The antenna selection circuit 60 is connected to a wireless communication circuit 62. In this example, a multi-input/multi-output (MIMO) method is adopted, and the wireless communication circuit 62 transmits/receives a plurality of, for example, three radio signals rf1, rf2, and rf3 with respect to the antenna selection circuit 60. If a non-MIMO method is adopted, the wireless communication circuit 62 transmits/receives a single radio signal rf1 with respect to the antenna selection circuit 60. In the MIMO method, the number of radio signals may be two, four, or more. The power for the antenna circuits 26a to 26d is supplied from the wireless communication circuit 62 by superposing on the radio signals rf1, rf2, and rf3. The power for the temperature sensors 20a to 20d is obtained from the radio signals rf1, rf2, and rf3, and is supplied to the temperature sensors 20a to 20d from the antenna selection circuit 60 through the power lines that are not shown.

The system controller 64 is connected to the wireless communication circuit 62, and the operation of the wireless communication circuit 62 is controlled by the system controller 64. The system controller 64 includes a processor (CPU). The system controller 64 executes an application program, or supplies a data transmission command and a data reception command to the wireless communication circuit 62. The wireless communication circuit 62 modulates transmission data base on the transmission command, or demodulates reception data based on the reception command. The system controller 64 switches the selectors 46a to 46e and the selectors 48a to 48e of the antenna circuits 26a to 26d in cooperation such that each of the array antennas 18a to 18d functions as a transmission antenna or a reception antenna.

The number of array antennas 18 of the personal computer 8 (in this case, four) is greater than the number of radio signals of MIMO method (in this case, three). That is, a so-called auxiliary array antenna that is not used in the radio communication exists. In the embodiment, there is a single auxiliary array antenna 18. However, there may be several auxiliary array antennas. The antenna selection circuit 60 uses three of four array antennas 18 to transmit/receive three radio signals rf1, rf2, and rf3. If one of the array antennas 18 used in the radio communication generates heat, the antenna selection circuit 60 switches the heating array antenna to an auxiliary array antenna and sets the heating array antenna to a non-operation state. The array antenna in the non-operation state radiates heat, and the temperature thereof decreases. Thus, heat generation caused by a continuous usage of the array antenna can be prevented. As a result, heating in the proximity of the array antenna of the casing of the personal computer 8 can be prevented, and low temperature burns of users can be prevented.

To the system controller 64, a main memory 66 formed of DRAM or the like, a graphics controller 70, an embedded controller/keyboard controller (EC/KBC) 72, a storage 76, a sound device 78, and the like are connected. The storage 76 is a non-volatile mass storage device such as HDD or SSD, and various types of programs and the like are stored therein. The system controller 64 executes the programs loaded from the storage 76 to the main memory 66.

The graphics controller 70 displays various data on the LCD panel 12. The various data include an alarm message related to heating of the array antenna. The EC/KBC 72 is a power management controller and is realized as a one chip microcomputer including a keyboard controller controlling the keyboard 16. The EC/KBC 72 includes a function to turn on/off the power by controlling the power circuit 74. The system controller 64 generates various types of sound from the sound device 78 such as a speaker. Various types of sound include an alarm related to heating of the array antenna. Note that, FIG. 7 does not show elements of an ordinary personal computer such as LAN device and USB connector that are not related to the invention.

[Antenna Selection Circuit 60]

Figure 8:
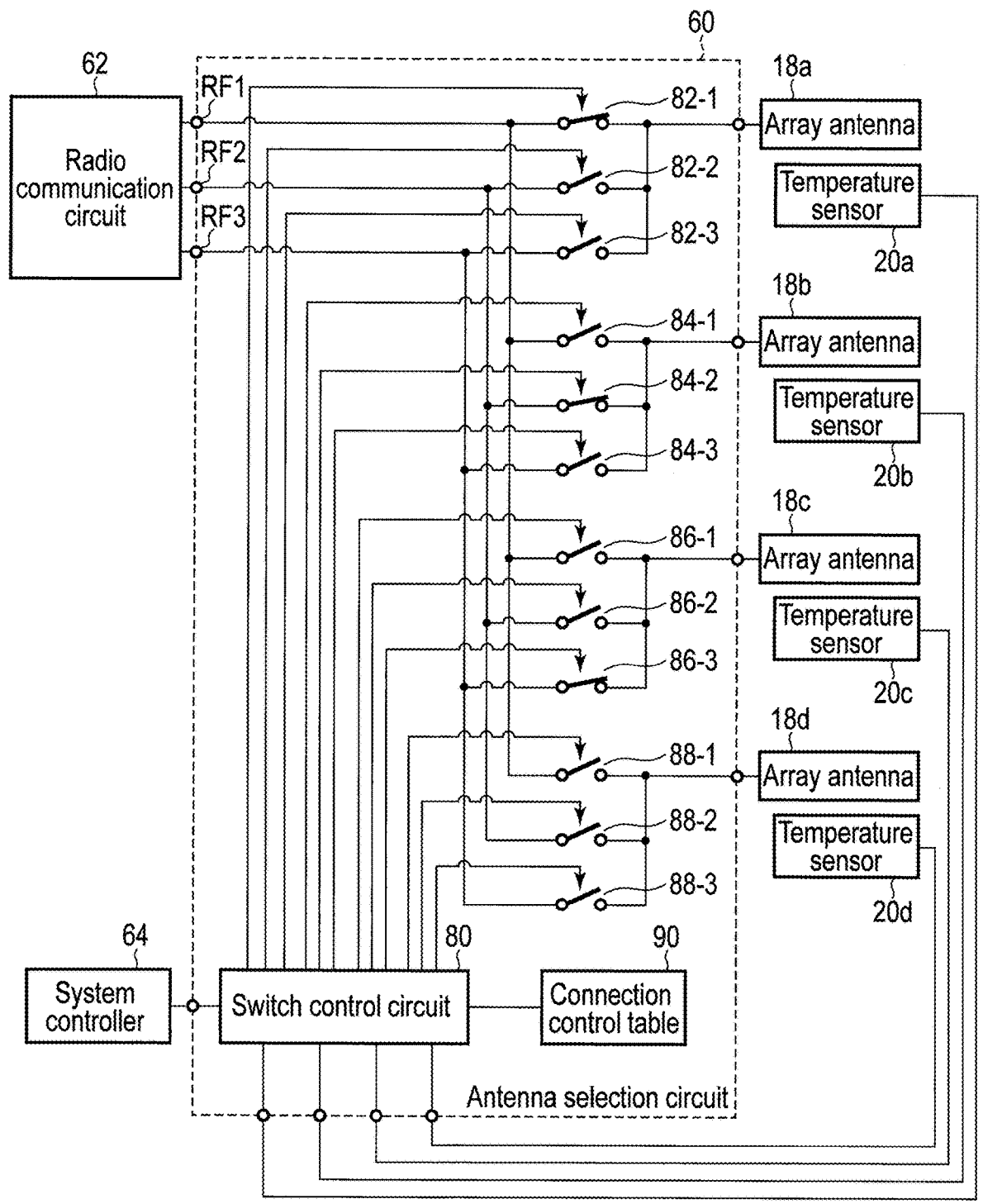
FIG. 8 is a block diagram showing an example of an antenna selection circuit 60 in the electronic device 8.

FIG. 8 shows an example of the circuit structure of the antenna selection circuit 60. The antenna selection circuit 60 includes ports (terminals) RF1, RF2, and RF3 connected to the wireless communication circuit 62. The radio signals rf1, rf2, and rf3 output from the wireless communication circuit 62 are input to the ports RF1, RF2, and RF3. Three radio signals rf1, rf2, and rf3 output from any three array antennas of the array antennas 18a to 18d (specifically, multiplexer/demultiplexers 50 of the antenna circuits 26) are output from the ports RF1, RF2, and RF3 to the wireless communication circuit 62.

The port RF1 is connected to the array antennas 18a to 18d (specifically, multiplexer/demultiplexers 50 of the antenna circuits 26) through on/off switches (switches) 82-1, 84-1, 86-1, and 88-1. The port RF2 is connected to the array antennas 18a to 18d through the switches 82-2, 84-2, 86-2, and 88-2. The port RF3 is connected to the array antennas 18a to 18d through the switches 82-3, 84-3, 86-3, and 88-3.

If the number of radio signals rf is one or two, the antenna selection circuit 60 may be provided with one port RF1 or two ports RF1 and RF2. If the number of radio signals rf is four or more, the antenna selection circuit 60 may further be provided with a port RF4 and the like, and provided with switches to connect the ports RF1, RF2, RF3, RF4 and the like to the array antennas 18a to 18d. The number of array antennas may be greater than the number of radio signals, and may be five or more.

Detection signals of the temperature sensors 20a, 20b, 20c, and 20d are supplied to a switch control circuit 80. A memory to store a connection control table 90 may be connected to the switch control circuit 80. The switch control circuit 80 turns on/off the switches 82-1 to 82-3, 84-1 to 84-3, 86-1 to 86-3, and 88-1 to 88-3, based on the detection signals and the connection control table 90. The switch control circuit 80 may be formed of a processor (CPU) or may be formed of a logic circuit.

As to three switches (i.e., 82-1 to 82-3, 84-1 to 84-3, 86-1 to 86-3, or 88-1 to 88-3) connected to each of the three array antennas for transmission and reception, one of them is turned on and the other two are turned off. Three switches connected to one array antenna that is not used for transmission and reception are all turned off. That is, of the three switches (for example, switches 82-1, 82-2, and 82-3) connected to each of the array antennas (for example, array antenna 18a), two or more are not turned on. Only one switch may be turned on or all three switches are turned off in any case. Thus, the radio signal rf1 is transmitted/received using any one of the array antennas 18a to 18d, the radio signal rf2 is transmitted/received using any one of the three remaining array antennas, and the radio signal rf3 is transmitted/received using any one of the two remaining array antennas.

The power of the memory storing the switch control circuit 80 and the connection control table 90 is obtained from the radio signals rf1, rf2, and rf3.

[MIMO]

Figures 9A, 9B:
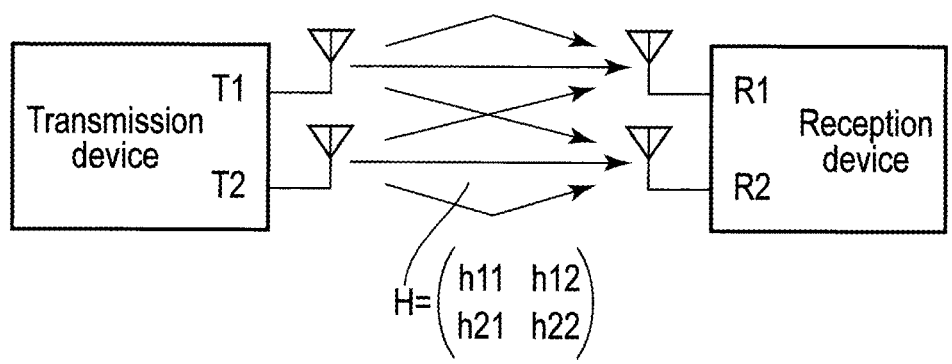
FIGS. 9A and 9B show a principle of an example of MIMO communication performed by the electronic device 8.

FIGS. 9A and 9B show a principle of an example of MIMO communication. Here, MIMO communication using two radio signals is shown. As shown in FIG. 9A, a transmission device includes two transmission antennas, and a reception device includes two reception antennas. The transmission device transmits two transmission signals having the same frequency from two transmission antennas at the same time. Transmitting a plurality of signals having the same frequency at the same time is referred to as spatial division multiplexing (SDM). A first transmission signal T1 transmitted from a first transmission antenna of the transmission device is received by a first reception antenna and also a second reception antenna of the reception device. Similarly, a transmission signal T2 transmitted from a second transmission antenna of the transmission device is received by the first reception antenna and also the second reception antenna of the reception device. If a transfer function from the first transmission antenna to the first reception antenna is given h11, a transfer function from the first transmission antenna to the second reception antenna is given h12, a transfer function from the second transmission antenna to the first reception antenna is given h21, and a transfer function from the second transmission antenna to the second reception antenna is given h22, the reception signals R1 and R2 are represented as shown in FIG. 9B. Here, n1 and n2 are noises included in the reception signals R1 and R2. The reception device can estimate the transmission signals T1 and T2 from the reception signals R1 and R2.

In the MIMO communication, when the same data are transmitted from the first transmission antenna and the second transmission antenna, reliability of data transmission (transfer quality) can be increased. Furthermore, when different data are transmitted from the first transmission antenna and the second transmission antenna, the transmission speed can be doubled in the MIMO communication using two radio signals as compared to a non-MIMO communication using one radio signal.

[Radio Communication Operation]

Figure 10:
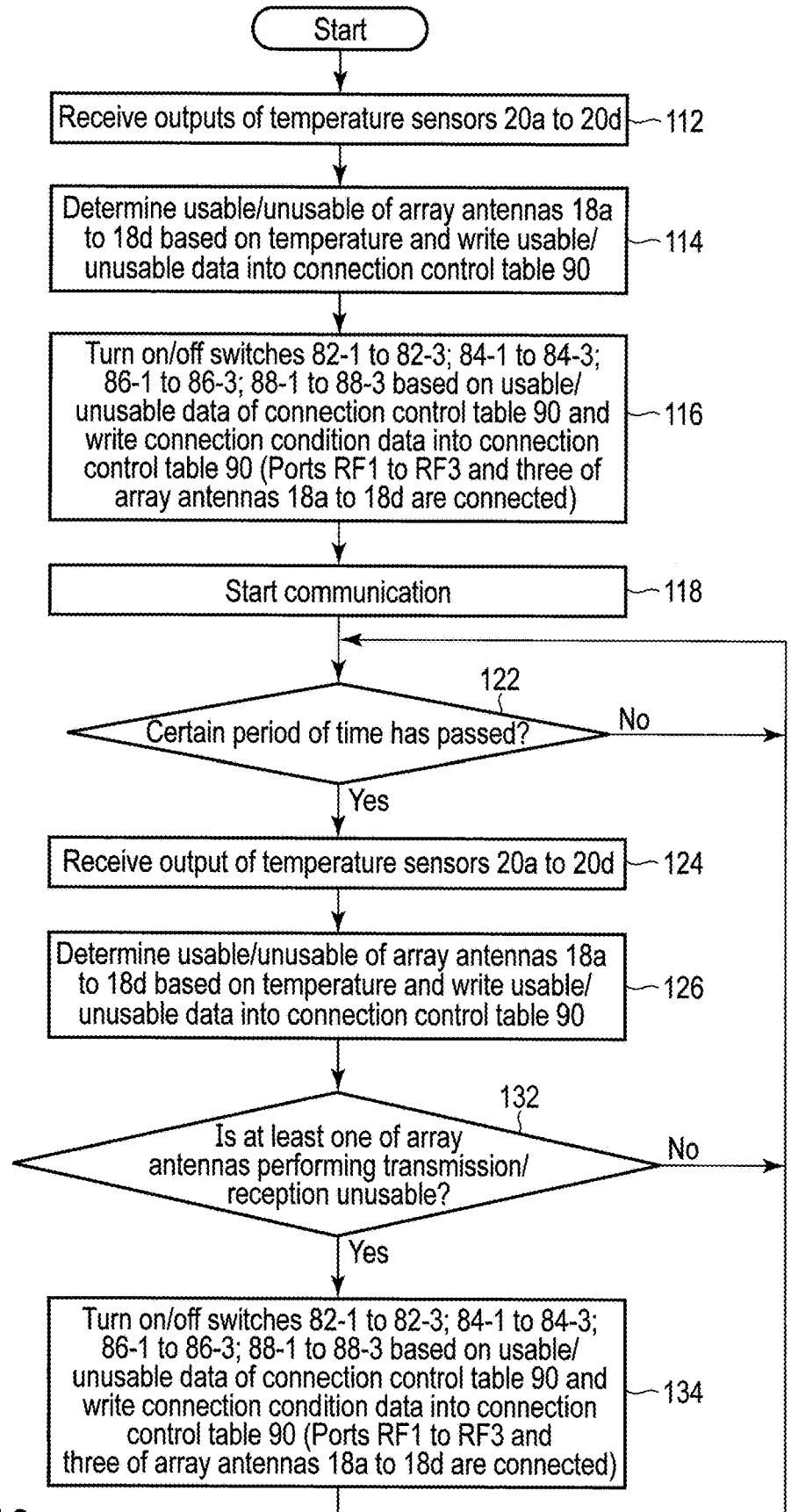
FIG. 10 is a flowchart showing an example of the MIMO communication performed by the electronic device 8.

Now, an example of radio communication according to the embodiment will be explained with reference to FIGS. 10 to 15. FIG. 10 is a flowchart of an example of the operation of the switch control circuit 80. FIGS. 11 to 15 show an example of transition of contents of the connection control table 90 to which the switch control circuit 80 refers.

When the personal computer 8 is turned on, each component of FIG. 7 is activated, and the temperature sensors 20a to 20d measure temperatures and output detection signals.

In step 112, the switch control circuit 80 receives the detection signals from the temperature sensors 20a to 20d. Each of the detection signals may indicate whether or not the measured temperature is above the allowable temperature, or may indicate the measured temperature itself.

In step 114, the switch control circuit 80 determines whether or not the array antenna 18a, 18b, 18c, or 18d is usable, based on the detection signal from the temperature sensor 20a, 20b, 20c, or 20d. Specifically, the switch control circuit 80 allows the usage of the array antenna 18a, 18b, 18c, or 18d if the temperature of the array antenna 18a, 18b, 18c, or 18d is not above the allowable temperature, and stops the usage of the array antenna 18a, 18b, 18c, or 18d if the temperature of the array antenna 18a, 18b, 18c, or 18d is above the allowable temperature. In step 114, the switch control circuit 80 writes usable/unusable data indicative of whether the array antennas 18a to 18d are usable or unusable into the connection control table 90.

An example of the connection control table 90 at this time is shown in FIG. 11. The connection control table 90 stores connection condition data and the usable/unusable data of each of the array antennas 18a to 18d. The connection condition data indicates whether or not the array antenna 18a, 18b, 18c, or 18d is connected to the wireless communication circuit 62, that is, whether or not the array antenna 18a, 18b, 18c, or 18d is used in the transmission/reception of the radio signal. An initial value of the connection condition data indicates not-connected. An initial value of the usable/unusable data may indicate usable or unusable. The connection control table 90 of FIG. 11 indicates that none of the array antennas 18a to 18d is connected to the wireless communication circuit 62 and all of the array antennas 18a to 18d is usable.

In step 116, the switch control circuit 80 refers to the usable/unusable data of the connection control table 90, and turns on/off the switches 82-1 to 82-3, 84-1 to 84-3, 86-1 to 86-3, and 88-1 to 88-3 to connect the ports RF1, RF2, and RF3 to three of the array antennas 18a, 18b, 18c, and 18d.

As shown in FIG. 11, any of the array antennas 18a to 18d can be used, and thus, the ports RF1, RF2, and RF3 may be connected to any of the array antennas 18a to 18d. Here, the switch 82-1 is turned on and the port RF1 is connected to the array antenna 18a, the switch 84-2 is turned on and the port RF2 is connected to the array antenna 18b, and the switch 86-3 is turned on and the port RF3 is connected to the array antenna 18c. The array antenna 18d is not connected to the wireless communication circuit 62 and is an auxiliary antenna. In step 116, furthermore, the switch control circuit 80 writes the connection condition data of each of the array antennas 18a to 18d into the connection control table 90. An example of the connection control table 90 at this time is shown in FIG. 12. The connection control table 90 of FIG. 12 indicates that any of the array antennas 18a to 18d can be used, the array antenna 18a is connected to the port RF1, the array antenna 18b is connected to the port RF2, the array antenna 18c is connected to the port RF3, and the auxiliary array antenna 18d is not connected to the wireless communication circuit 62.

In step 118, the radio signals rf1, rf2, and rf3 are transmitted/received using the array antennas 18a, 18b, and 18c, respectively, and the radio communication is started.

In step 122, the switch control circuit 80 determines whether or not a certain period of time, for example, whether ten seconds has passed. If the certain period of time has passed, the operation becomes waiting in step 122. If the certain period of time has passed, in step 124, the switch control circuit 80 receives the outputs of the temperature sensors 20a to 20d.

In step 126, the switch control circuit 80 determines, as in step 114, whether or not the temperature of the array antenna 18a, 18b, 18c, or 18d is above the allowable temperature, based on the detection signal from the temperature sensors 20a, 20b, 20c, or 20d. Here, it is assumed that the temperature of the array antenna 18a becomes above the allowable temperature. Since the temperature of the array antenna 18a is above the allowable temperature, the usage of the array antenna 18a is changed from usable to unusable. In step 126, furthermore, the switch control circuit 80 writes (updates) the usable/unusable data indicative of whether or not the array antennas 18a to 18d are usable into the connection control table 90. An example of the connection control table 90 at that time is shown in FIG. 13. The connection condition data of the connection control table 90 are the same as in FIG. 12, but the usable/unusable data of the array antenna 18a is updated from usable to unusable.

In step 132, the switch control circuit 80 determines whether or not at least one of the array antennas (here, array antennas 18a, 18b, and 18c) connected to the wireless communication circuit 62 and performing the transmission/reception of the radio signals is unusable. If the array antennas 18a, 18b, and 18c are all usable, the process returns to step 122.

If at least one of the array antennas 18a, 18b, and 18c is unusable, in step 134, the switch control circuit 80 refers to the usable/unusable data of the connection control table 90, and turns on/off the switches 82-1 to 82-3, 84-1 to 84-3, 86-1 to 86-3, and 88-1 to 88-3 to reconnect the port (here, port RF1) connected to the unusable array antenna (here, array antenna 18a), to an usable auxiliary array antenna (here, array antenna 18d). That is, the switch control circuit 80 keeps the switch 84-2 on to connect the port RF2 to the array antenna 18b, keeps the switch 86-3 on to connect the port RF3 to the array antenna 18c, and turns off the switch 82-1 and turns on the switch 88-1 to connect the port RF1 to the array antenna 18d. Though the array antenna 18a is not connected to the ports RF1, RF2, or RF3, the array antenna 18a is not usable, and thus, cannot be an auxiliary antenna. In step 134, furthermore, the switch control circuit 80 writes the connection condition data of each of the array antennas 18a to 18d into the connection control table 90. An example of the connection control table 90 at that time is shown in FIG. 14. The connection control table 90 of FIG. 14 indicates that the array antenna 18a is unusable, the array antennas 18b to 18d are usable, the array antenna 18a is not connected to the wireless communication circuit 62, the array antenna 18b is connected to the port RF2, the array antenna 18c is connected to the port RF3, and the array antenna 18d is connected to the port RF1.

Then, the radio signals rf1, rf2, and rf3 are transmitted/received using the array antennas 18d, 18b, and 18c, respectively, and the radio communication is continued. In this state, there is no auxiliary antenna, and if any of the array antennas 18d, 18b, and 18c is heated, radio communication cannot be continued. However, the array antenna 18a in the non-operation state radiates heat, and after a while, the measured temperature of the temperature sensor 20a decreases, and the array antenna 18a becomes usable in the determination process of step 126. Thus, the array antenna 18a can be used as an auxiliary array antenna. The connection control table 90 at that time is shown in FIG. 15. Thus, thereafter, even if any of the array antennas 18d, 18b, and 18c becomes high temperature and unusable, the array antenna 18a can be used instead of the heated array antenna to continue the radio communication.

In the present embodiment, the number of array antennas 18a to 18d is greater than the number of the radio signals to be transmitted/received, the sensors 20a to 20d for measuring the temperatures of the array antennas 18a to 18d are provided with the array antennas 18a to 18d respectively, and the array antennas 18a to 18d used for the transmission/reception are selectively switched before the temperature of any of the array antennas 18a to 18d performing the transmission/reception becomes excessively high. Therefore, the heating of the array antennas 18a to 18d can be prevented. Thus, deterioration of quality of transmission/reception signal communication caused by the heated array antenna does not occur. Furthermore, low temperature burns of users caused by the heating of the casing of the personal computer 8 including the array antennas 18a to 18d can be prevented.

[Modification]

The system controller 64 is connected to the antenna selection circuit 60, and can monitor the operation of the antenna selection circuit 60 or the contents of the connection control table 90. Thus, if at least one of the array antennas connected to the wireless communication circuit 62 and performing the transmission/reception of the radio signals becomes unusable from usable, the system controller 64 may display, in step 134, a message alarming that at least one of the array antennas is heated on the LCD panel 12, or may generate an alarming sound from the sound device 78. Furthermore, if the number of the array antennas performing the transmission/reception of which the temperatures are above the allowable temperature is greater than the number of auxiliary array antennas, and thus, if switching to an auxiliary array antenna is impossible, a message different from the above may be displayed on the LCD panel 12, or an alarming sound may be generated from the sound device 78.

In FIGS. 11 to 15, the number of radio signals rf is given three, and thus, the number of array antennas 18 is four or more. With the number of the array antennas 18 is four or five, if any of the array antennas performing the transmission/reception becomes high temperature, the number of auxiliary array antennas is one or two. Thus, there is little option to select the auxiliary antenna instead of the heated array antenna. However, if, for example, the number of the array antennas 18 is six or more, and the number of auxiliary array antennas is three or more, there may be various ways to select the auxiliary antenna instead of the heated array antenna. For example, the selection may be performed orderly such that array antennas can be used evenly, or if the characteristics of array antennas (radio characteristics, radiation characteristics, and the like) are different, priority of the selection of each of the array antennas may be determined in advance. To achieve this, the connection control table 90 may include a field to record the priority. Alternatively, the connection control table 90 may include a field to record a history of heating (highest temperature and the like) of each of the array antennas 18a to 18d. If the memory storing the connection control table 90 is a volatile memory, the connection control table 90 may be temporarily stored in the storage 76 in the turning off operation, and the connection control table 90 may be written into the memory from the storage 76 in the turning on operation.

Switching of the array antennas 18 to perform transmission/reception may be performed immediately after the detection of unusable in step 132. Alternatively, if data conveyed by the radio signal rf are stopped in the middle of process, for example, if data of a web page are received, the switching may be waited until data reception of one page is completed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An antenna device comprising:
   at least one terminal;
   a plurality of array antennas;
   a plurality of sensors corresponding to the plurality of array antennas, each sensor of the plurality of sensors measuring a temperature of an array antenna corresponding to the sensor among the plurality of array antennas; and
   a selection circuit that selects at least one array antenna from the plurality of array antennas, based at least in part on the temperature measured by each sensor, wherein
   the at least one array antenna is connected to a wireless communication circuit via the at least one terminal.

2. The antenna device of claim 1, wherein
   the selection circuit selects the at least one array antenna having the temperature lower than a first temperature.

3. The antenna device of claim 2, wherein,
   when the temperature of one of the at least one array antenna becomes the first temperature or higher than the first temperature,
   the selection circuit deselects the one of the at least one array antenna, and selects another array antenna having the temperature lower than the first temperature from the plurality of array antennas.

4. The antenna device of claim 2, further comprising:
an alarm generator that generates an alarm when the temperature of one of the at least one array antenna becomes the first temperature or higher than the first temperature.

5. The antenna device of claim 1, wherein
each sensor comprises a thermistor, a thermocouple, a diode, or a bipolar transistor.

6. An electronic device comprising:
a wireless communication circuit;
a plurality of array antennas;
a plurality of sensors corresponding to the plurality of array antennas, each sensor of the plurality of sensors measuring a temperature of an array antenna corresponding to the sensor among the plurality of array antennas; and
a selection connection circuit that selects at least one array antenna from the plurality of array antennas, based at least in part on the temperature measured by each sensor, and connects the at least one array antenna to the wireless communication circuit.

7. The electronic device of claim 6, wherein
the selection connection circuit selects the at least one array antenna having the temperature lower than a first temperature.

8. The electronic device of claim 7, wherein,
when the temperature of one of the at least one array antenna becomes the first temperature or higher than the first temperature,
the selection connection circuit deselects the one of the at least one array antenna, and selects another array antenna having the temperature lower than the first temperature from the plurality of array antennas.

9. The electronic device of claim 7, further comprising:
an alarm generator that generates an alarm when the temperature of one of the at least one array antenna becomes the first temperature or higher than the first temperature.

10. The electronic device of claim 6, wherein
each sensor comprises a thermistor, a thermocouple, a diode, or a bipolar transistor.

11. The electronic device of claim 6, wherein
the wireless communication circuit comprises a plurality of ports for multi-input multi-output wireless communication,
the number of the plurality of array antennas is greater than the number of the plurality of ports, and
the selection connection circuit selects array antennas of which the number is equal to the number of the plurality of ports from the plurality of array antennas, and connects each of the selected array antennas to each of the plurality of ports differently.

12. A wireless communication method for an electronic device,
the electronic device comprising
a wireless communication circuit,
a plurality of array antennas, and
a plurality of sensors corresponding to the plurality of array antennas, each sensor of the plurality of sensors measuring a temperature of an array antenna corresponding to the sensor among the plurality of array antennas,
the wireless communication method comprising:
selecting at least one array antenna from the plurality of array antennas, based at least in part on the temperature measured by each sensor; and
connecting the at least one array antenna to the wireless communication circuit.

13. The method of claim 12, wherein
the selecting comprising selecting the at least one array antenna having the temperature lower than a first temperature.

14. The method of claim 13, further comprising:
when the temperature of one of the at least one array antenna becomes the first temperature or higher than the first temperature,
deselecting the one of the at least one array antenna; and
selecting another array antenna having the temperature lower than the first temperature from the plurality of array antennas.

15. The method of claim 13, further comprising:
generating an alarm when the temperature of one of the at least one array antenna becomes the first temperature or higher than the first temperature.

16. The method of claim 12, wherein
the wireless communication circuit comprises a plurality of ports for multi-input multi-output wireless communication, and
the number of the plurality array antennas is greater than the number of the plurality ports,
the method further comprising:
selecting array antennas of which the number is equal to the number of the plurality of ports from the plurality of array antennas; and
connecting each of the selected array antennas to each of the plurality of ports differently.

* * * * *